(12) United States Patent
Carlough et al.

(10) Patent No.: US 9,684,514 B2
(45) Date of Patent: Jun. 20, 2017

(54) INFERENCE BASED CONDITION CODE GENERATION

(71) Applicant: International Business Machines Corporation, Armonk, NY (US)

(72) Inventors: Steven R. Carlough, Poughkeepsie, NY (US); Son T. Dao, Stuttgart (DE); Petra Leber, Ehningen (DE); Silvia M. Mueller, Altdorf (DE)

(73) Assignee: International Business Machines Corporation, Armonk, NY (US)

( * ) Notice: Subject to any disclaimer, the term of this patent is extended or adjusted under 35 U.S.C. 154(b) by 328 days.

(21) Appl. No.: 14/482,042

(22) Filed: Sep. 10, 2014

(65) Prior Publication Data

US 2016/0070572 A1    Mar. 10, 2016

(51) Int. Cl.
*G06F 9/30* (2006.01)

(52) U.S. Cl.
CPC ........ *G06F 9/30094* (2013.01); *G06F 9/3001* (2013.01); *G06F 9/30025* (2013.01); *G06F 9/30058* (2013.01); *G06F 9/30079* (2013.01)

(58) Field of Classification Search
None
See application file for complete search history.

(56) References Cited

U.S. PATENT DOCUMENTS

| 4,578,750 A | 3/1986 | Amdahl et al. |
| 6,598,153 B1 | 7/2003 | Flachs et al. |
| 7,441,098 B2 | 10/2008 | Wilson |
| 2003/0023959 A1* | 1/2003 | Park ............... G06F 8/4451 717/151 |
| 2013/0067202 A1 | 3/2013 | Henry et al. |
| 2013/0297918 A1 | 11/2013 | Goel et al. |
| 2014/0025938 A1 | 1/2014 | Gonion |

OTHER PUBLICATIONS

Carlough et al., "Condition Code Generation," U.S. Appl. No. 14/514,546, filed Oct. 15, 2014.
List of IBM Patents or Patent Applications Treated As Related.
Busaba et al., "IBM zEnterprise 196 microprocessor and cache subsystem," IBM Journal of Research and Development, Jan. 23, 2012, pp. 1:1-1:12, vol. 56, Issue1/2, Copyright 2012 by International Business Machines Corporation D.O.I. 10.1147/JRD.2011.2173962.

* cited by examiner

*Primary Examiner* — William B Partridge
(74) *Attorney, Agent, or Firm* — Nolan M. Lawrence

(57) ABSTRACT

A condition code can depend upon a numerical output of a floating point operation for a processing pipeline. A classification can be determined for the floating point operation of a received instruction. In response to the classification and using condition determination logic, a value can be calculated for the condition code by inferring from data that is available from the processing pipeline before the numerical output is available. The value for the condition code can be provided to branch decision logic of the processing pipeline.

2 Claims, 7 Drawing Sheets

INFERENCE BASED CONDITION CODE GENERATION

BACKGROUND

The present disclosure relates to computer processor architecture, and more specifically, to condition code generation for a processor pipeline.

Computer processors include a number of different circuitry for performing different operations on data. The instruction set architecture (ISA) can define the set of operations carried out by a particular processor. Processors may use a pipelined design and may also include functions such as in-order or out-of-order execution. A front end issue pipeline can process and then issue instructions to different execution units accordingly. For example, the issue pipeline can format instructions into a form (e.g., micro-instructions) that can be recognized by other components of the processor. These micro-instructions may then be executed in different execution units of a processor. A particular group of execution units are referred to as floating-point units.

SUMMARY

Embodiments are directed toward a method for generating a condition code that depends upon a numerical output of a floating point operation for a processing pipeline. A classification can be determined for the floating point operation of a received instruction. In response to the classification and using condition determination logic, a value can be calculated for the condition code by inferring from data that is available from the processing pipeline before the numerical output is available. The value for the condition code can be provided to branch decision logic of the processing pipeline.

According to embodiments, a system can be provided for generating a condition code that depends upon a numerical output of a floating point operation for a processing pipeline. The system can include logic circuitry that is configured to determine a classification for the floating point operation of a received instruction. The logic circuitry can also calculate, in response to the classification and using condition determination logic, a value for the condition code by inferring from data that is available from the processing pipeline before the numerical output is available. The value for the condition code can be provided, by the logic circuitry to branch decision logic of the processing pipeline.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
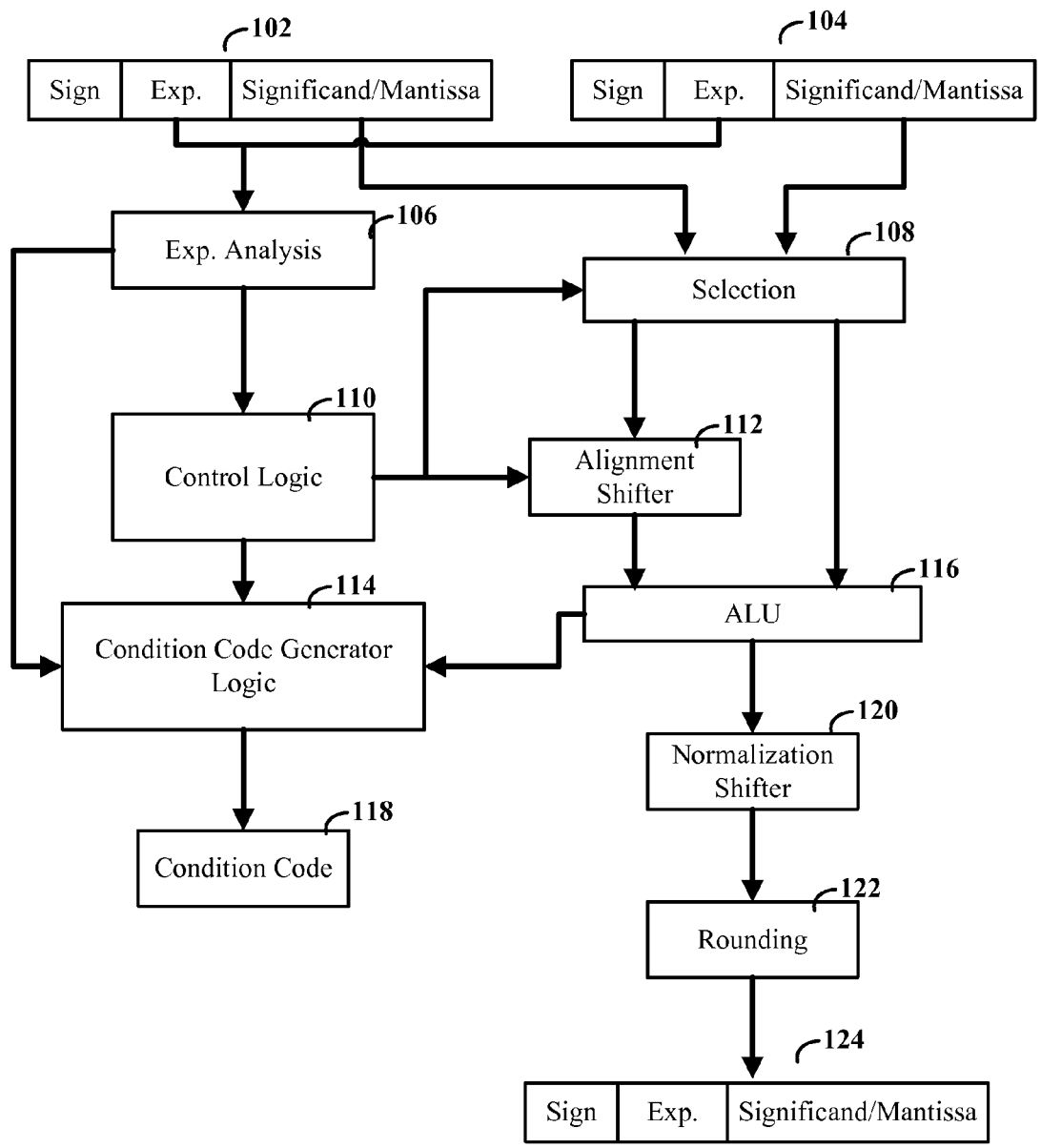
FIG. 1 depicts a block diagram of a floating point operation unit with condition code logic, consistent with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to computer processor circuits, more particular aspects relate to the generation of condition codes within a computer processor pipeline. While the present disclosure is not necessarily limited to such applications, various aspects of the disclosure may be appreciated through a discussion of various examples using this context.

Embodiments of the present disclosure are directed toward early generation of condition codes for branch instructions, where the value of the condition codes can be dependent upon floating point operations. Branch instructions allow a processor stream to branch to, and execute, instructions that are not sequential. Conditional branch instructions allow for branching that is dependent upon the evaluation of a corresponding condition (e.g., equal to zero, less than zero, greater than zero, or out of range). This condition may be based upon state information from an operation prior to the branch instruction. This state information can be stored in a special register and can be referred to as a condition code. Aspects of the present disclosure relate to a recognition that various pipeline processors can benefit from early generation of condition codes that are dependent upon the result of floating point operations.

Early generation of a condition code can be particularly useful when there is not much latency between when a floating point operation that sets a condition code is issued and when the condition code is used by a branch instruction. For instance, an ISA may allow for a condition code to be set based upon a comparison operation. The comparison may use registers that are set by, or depend on, the results of a prior floating point operation. A subsequent branch instruction would therefore be at least one instruction removed from the floating point operation. Consistent with some embodiments, an ISA may allow for condition codes to be set directly by a floating point operation (e.g., add, subtract or convert). Thus, it is possible that a branch instruction may immediately follow a floating point operation that sets the condition code. The resulting reduction in latency between the floating point operating and use of a dependent condition code can be facilitated by early generation of the condition code during the execution of the floating point operation upon which the condition code depends.

Floating point operations, such as add and subtract, may include pipeline stages that normalize and round the result of the operations. Various embodiments are directed toward generating condition codes using data available before normalization and rounding functions are completed. For instance, condition code generation logic can be configured to determine which condition the result of the operation meets based upon data available in the pipeline stages before normalization and rounding.

Various embodiments can be used to determine condition codes for a variety of different architectures and types of floating point execution units. One type of execution unit is a multiply-accumulate unit (MAC). A more specific example is a fused floating-point multiply-accumulate (FPMAC) unit. A MAC unit can multiply two operands of an instruction and then accumulate the resulting product with a third operand of the instruction. Similar execution units can perform mathematical operations such as additions, subtractions and multiplications by appropriate selection of the third operand.

Various embodiments can be used with floating point units that are split into a near path and a far path. The near path is used when the effective operation is a subtraction and the absolute value of the exponent difference between the source operands is less than 2. The far path can be used for the remaining operations. Each path can compute the operation in parallel, and the correct output is selected at the end.

Certain embodiments are directed toward condition code determination logic that can be useful for high performing out-of-order processors. Such processors may be able to use a condition code several cycles before the arithmetical operation is completed. This means, for performance reasons the hardware would need to set the condition code which indicates whether the result is equal to zero, less than zero, greater than zero, or out of range several cycles before the result of the operation is known rather than one cycle after the result is known.

Turning now to the figures, FIG. 1 depicts a block diagram of a floating point operation unit with condition code logic, consistent with embodiments of the present disclosure. As discussed in more detail herein, condition code generator logic 114 can be configured to generate condition codes 118 based upon data from the floating point operation unit. More particularly, the data can be obtained from a point prior to normalization and rounding (depicted by blocks 120 and 122, respectively).

Operands 102 and 104 represent input floating point values to be processed by the floating point operation unit. The components of the operands define their respective floating point value by: the sign (+/−), exponent, and significand or mantissa. Exponent analysis logic 106 can analyze the exponents of the operands 102 and 104. For instance, exponent analysis logic 106 may determine which of the exponents is larger and by how much. This type of analysis can then be used to determine which of the significands should be shifted, as well as how much it should be shifted.

Control logic 110 can be configured to use information, such as data from the exponent analysis logic 106, to control various stages of the floating point operation unit. For instance, the control logic 110 can direct selection unit 108 to route the significands to an appropriate path within the floating point operation unit. Alignment shifter block 112 can be configured to shift the significand of one of the operands 102 and 104 to match the other of the operands. Arithmetic logic unit (ALU) 116 can perform the appropriate operation (e.g., addition, subtraction or compare) on the operands. The result from the ALU 116 can then be normalized by normalization shifter block 120 and rounded by rounding block 122. The resulting floating point number, 124, can then be sent to the appropriate register file and/or directly for use by other instructions.

Consistent with embodiments, condition code generator logic 114 can use the output, or an intermediate result, of the ALU 116 to determine the appropriate condition code 118. As discussed in more detail herein, the condition code generator logic 114 can determine a value for the condition code 118 based upon the type of operation being performed, an analysis of the operands 102, 104, data from the exponent analysis logic unit 106, the output of the ALU 116 and combinations thereof. As a result, in a high frequency design the condition code generator logic 114 can begin determining the condition code 118 up to two cycles before the value of floating point number 124 is known. This can allow for the condition code to be available for use 2 (or more) cycles sooner.

Figure 2:
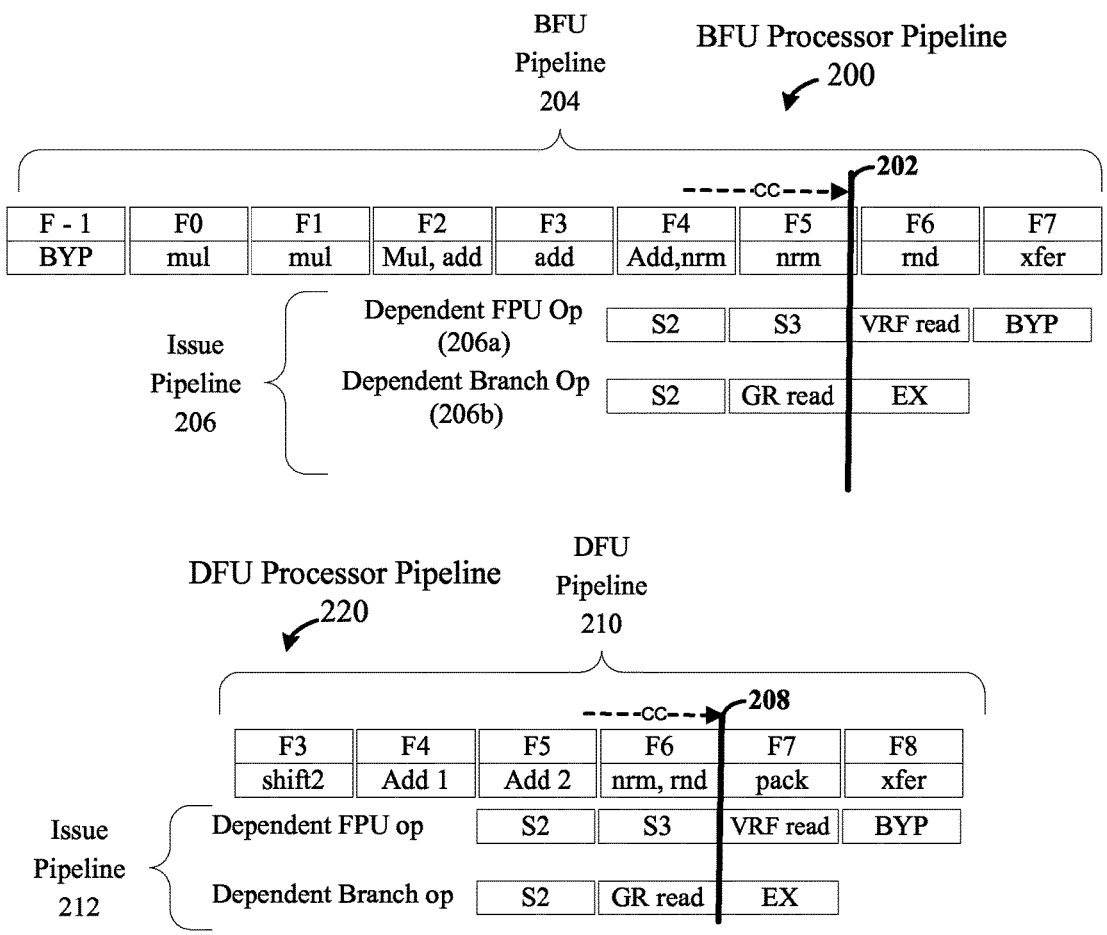
FIG. 2 depicts processor pipeline stages for several floating point units, consistent with embodiments of the present disclosure.

FIG. 2 depicts processor pipeline stages for several floating point units, consistent with embodiments of the present disclosure. Consistent with certain embodiments, condition codes can be generated for a pipelined binary floating-point unit (BFU), an example of which may be consistent with pipeline stages 200. Pipeline stages 200 include the early pipeline stages (issue pipeline 206) of two instructions as well as the execution stages of a BFU execution pipeline 204. The stages of the BFU pipeline 204 are each labelled with a corresponding F value, beginning at F-1 and ending at F8. F-1 represents a stage before the BFU pipeline (e.g., the last stage of the issue pipeline). The first one or two stages of issue pipeline 206 are similarly labelled with a corresponding S value (S2 or S3). Where S2 (for a FPU operation 206a) and S3 (for a branch operation 206b) represent the stages of the issue pipeline in which instruction gets sent to the execution unit.

As depicted in pipeline stage 200, the BFU pipeline 204 performs a series of different operations that can include bypassing (byp) register files, multiplication (mul), addition (add) normalization (nrm), rounding (rnd), transferring (xfer), and write back (WB). Consistent with embodiments of the present disclosure, condition code generator logic (such as discussed in connection with FIG. 1), can begin generating condition codes during stage F4, as indicated by the dashed arrow. While the condition code generator logic may be able to generate condition codes sooner, embodiments of the present disclosure can allow the condition code generation to begin at least this early (e.g., before normalization and rounding). Accordingly to various embodiments, the condition code can then be available for use by other instructions at time point 202.

Issue pipeline 206 shows sets of pipeline stages for two different possible instructions, either of which may follow, and depend upon, the instruction for the BFU pipeline 204. The first/upper set of pipeline stages 206a are for a dependent floating point unit (FPU) operation (e.g., such as for addition, multiplication, other operation). The second set of pipeline stages (206b) are for a dependent branch operation. For instance, the FPU operation in the issue pipeline 206 could be for a multiply operation that uses a source register corresponding to a target register of the prior BFU operation 204. The branch operation could be a conditional branch and the prior BFU operation could be an instruction that sets the condition code used by the conditional branch. In this example, the ISA would include instructions that allow for simple floating point operations (e.g., add, subtract or compare) to directly set the condition code (e.g., as opposed to a separate test instruction setting the condition code).

In the particular example shown of a BFU shown in FIG. 2, the dependent FPU instruction (206a) gets started such that its bypass stage aligns with the XFER of the instruction (204), and thus the normalized (F5) and rounded result (F6) is available in time to bypass the register file and get passed to the subsequent FPU instruction. Accordingly, the S2 issue cycle of the subsequent FPU instruction lings up with the F4 cycle of the BFU instruction. The pipeline stages (206b) for a dependent branch instruction are also aligned such that its S2 issue cycle aligns with the F4 cycle of the BFU instruction (204). In the particular example, the branch unit has a short pipeline, and the condition code already is used at the start of the EX cycle of the branch instruction at time point 202. Accordingly, if the processor were configured to generate the condition code from the rounded and normalized result of the prior instruction, then the condition code would not yet be available. One manner in which this issue could be handled would be to detect this occurrence and to reissue the dependent branch operation. The result of this reissuance, however, may delay instructions that rely upon the result of the branch operation. For example, if the instruction queue is particularly large, it may be a significant amount of time before the reissued branch is finally processed. Some of the other instructions in the queue (e.g., for the same stream) might then be stalled. Accordingly, providing the condition code earlier can be useful for reducing, or eliminating, penalties associated with such reissuances.

Consistent with certain embodiments, condition codes can be generated for a pipelined decimal floating-point unit (DFU), an example of which may be consistent with pipeline stages 220. Similar to the discussion above, pipeline stages 220 include stages of an issue pipeline 212 as well as the execution stages of a DFU execution pipeline 204. The stages of the DFU pipeline are also labelled similarly.

The pipeline stages 220 are depicted relative to an addition operation in which the normalization and rounding are carried out in a single stage (F6). While this stage (F6) completes before the execution (EX) stage of the dependent branch operation in the issue pipeline 212, the data is not available due to transfer times and the time it takes to compute the condition code based on the rounded result of (F6). Accordingly, having the condition code begin generation during the addition stage (F5), as indicated by the dashed arrow, can facilitate the condition code being available at time point 208, and allow the dependent branch operation to move forward with the execution stage. As discussed herein, this may avoid reissuance of the dependent branch operation and associated penalties.

Figure 3:
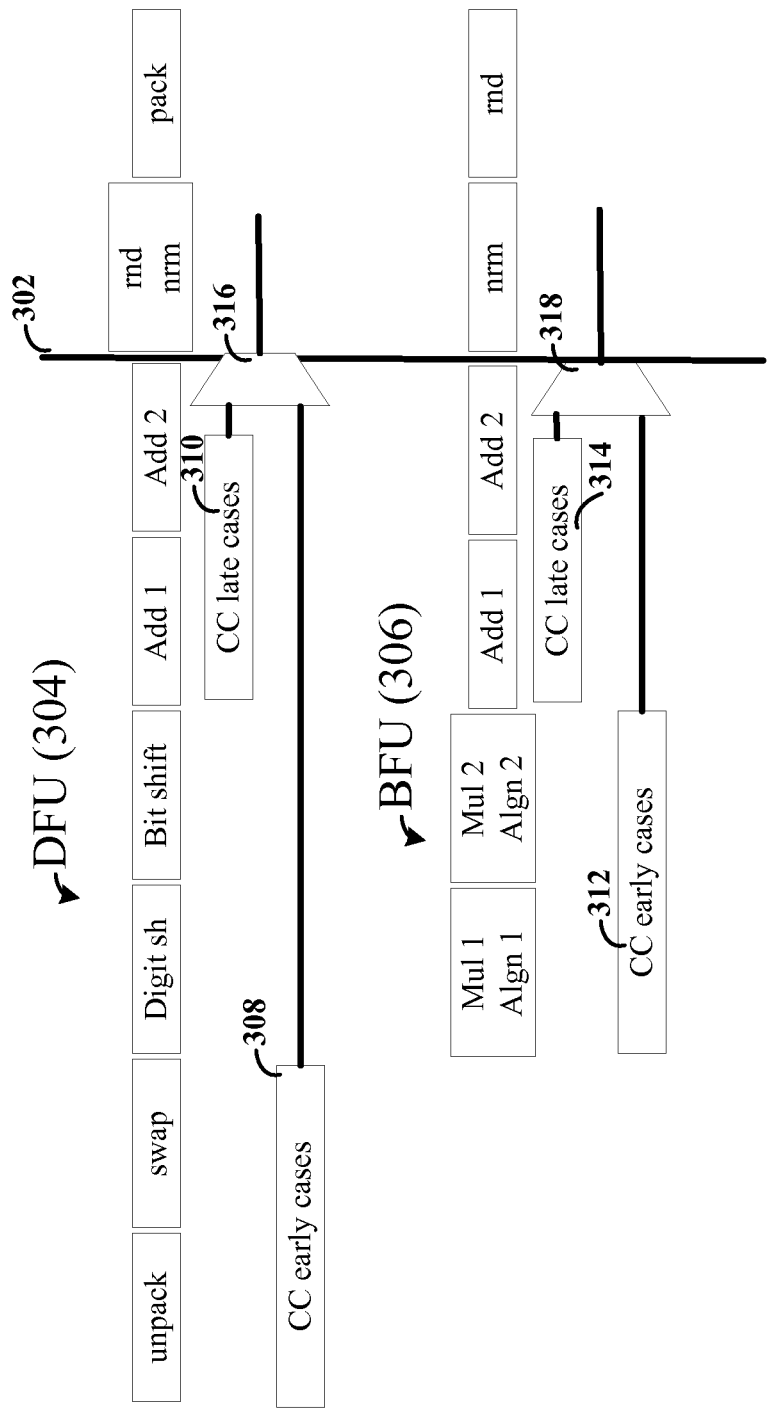
FIG. 3 depicts timing of condition code generation for two different pipeline stages, consistent with embodiments of the present disclosure.

FIG. 3 depicts timing of condition code generation for two different pipeline stages, consistent with embodiments of the present disclosure. The DFU (304) pipeline stages and the BFU (306) pipeline stages are consistent with the pipeline stages associated with addition, subtraction and compare instructions for example processors. The various embodiments of this disclosure, however, are not necessarily limited to these specific set and arrangement of pipeline stages.

Beneath each of the pipelines (304, 306) are two different condition code (CC) generation stages (308, 310 and 312, 314, respectively). For instance, CC early cases 308, 312 represent a set of condition code situations in which the condition code can be determined/generated very early in the pipeline because the data can indicate certain conditions that allow the value of the condition code to be inferred. An example includes data that indicates that one of the operands is a not-a-number (NaN) value, which for certain operations can indicate that the result of the operation is also NaN. The CC late cases 310, 314 represent situations in which the condition code needs data from further along in the respective pipeline stages. In particular, the CC late cases 310, 314 may need data from the addition stages (but before rounding and normalization).

As shown in FIG. 3, both the early and late cases can be carried out in parallel, a selection circuit 316, 318, such as a multiplexer, can be used to select between the appropriate condition codes. In this manner, the condition code can be made available earlier for some instances than for others (e.g., 6 stages before completion of the full result of the operation in the DFU (304) and 4 stages before completion of the full result of the operation in the BFU (306)). It is noted, however, that even the late case are shown as having the condition code generated by time 302, which is 2 stages prior to the completion of the full result, e.g., 2 cycles prior to the completion of the normalization, rounding and packing stages.

Figure 4:
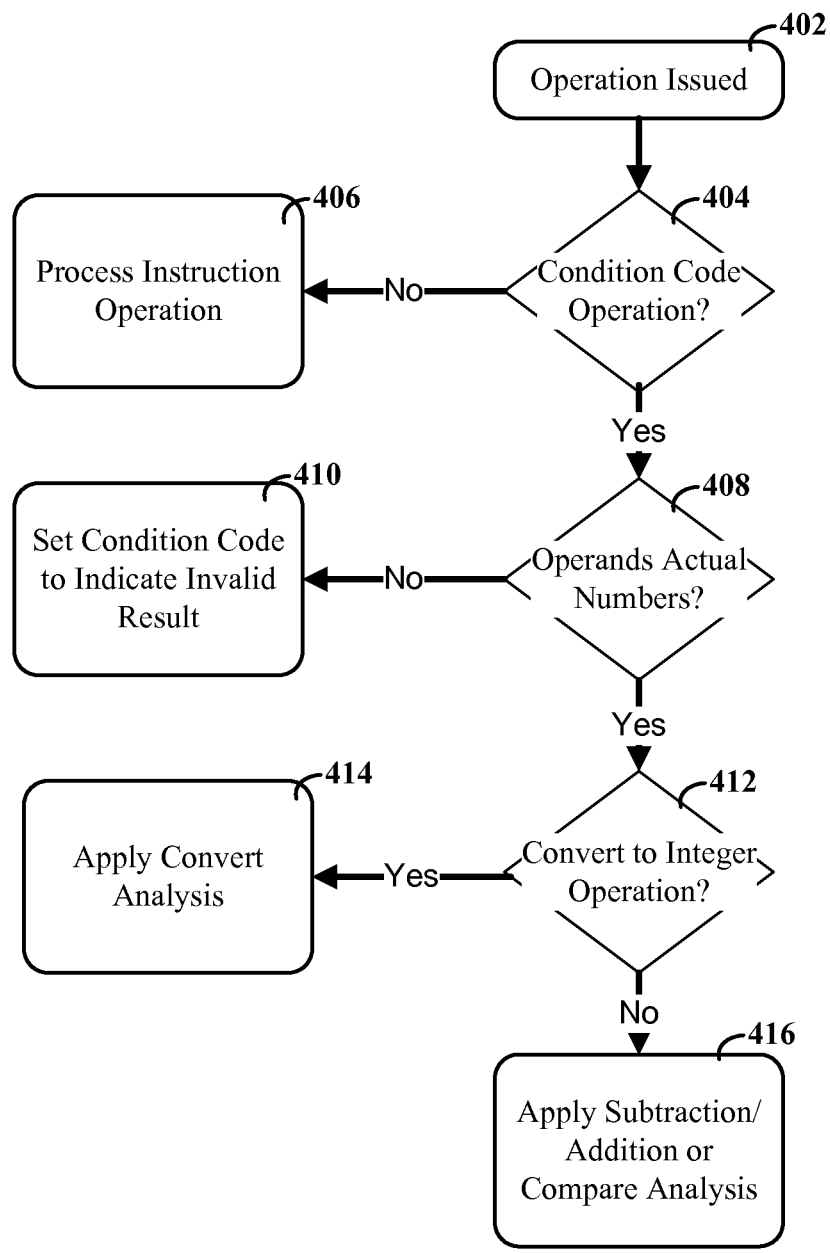
FIG. 4 depicts a flow diagram for classifying a received instruction relative to condition code generation, consistent with embodiments of the present disclosure.

FIG. 4 depicts a flow diagram for classifying a received instruction relative to condition code generation, consistent with embodiments of the present disclosure. When an operation for an instruction is issued, per block 402, the computer processor system can be configured to determine whether or not the operation results are setting the condition code, per block 402. As discussed herein, this can include identifying operations that perform mathematical functions and also set the condition code. For instance, an instruction may add two operands and set the condition code relative to whether the result is greater, less or equal to zero. If the operation does not set a condition code, then the instruction can process normally, per block 406.

If the operation does set a condition code, then the processor system can determine whether or not each of the operand(s) are actual numbers, per block 408. If any operand is not an actual number (e.g., either not-a-number or invalid values), then the resulting operation will be invalid and the condition code can be set accordingly, per block 410. This can be the case for both not-a-number conditions and invalid values (e.g., there are data types, like Binary-coded-decimals, where some values can have no meaning relative to the operation). If the operands are valid numbers, then the system can determine whether or not the operation involves a convert floating point to integer, per block 412. If so, then the condition code logic can apply a convert to integer analysis, per block 414. If not, then the condition code logic can apply add, subtract and compare analysis, per block 416.

Figure 5:
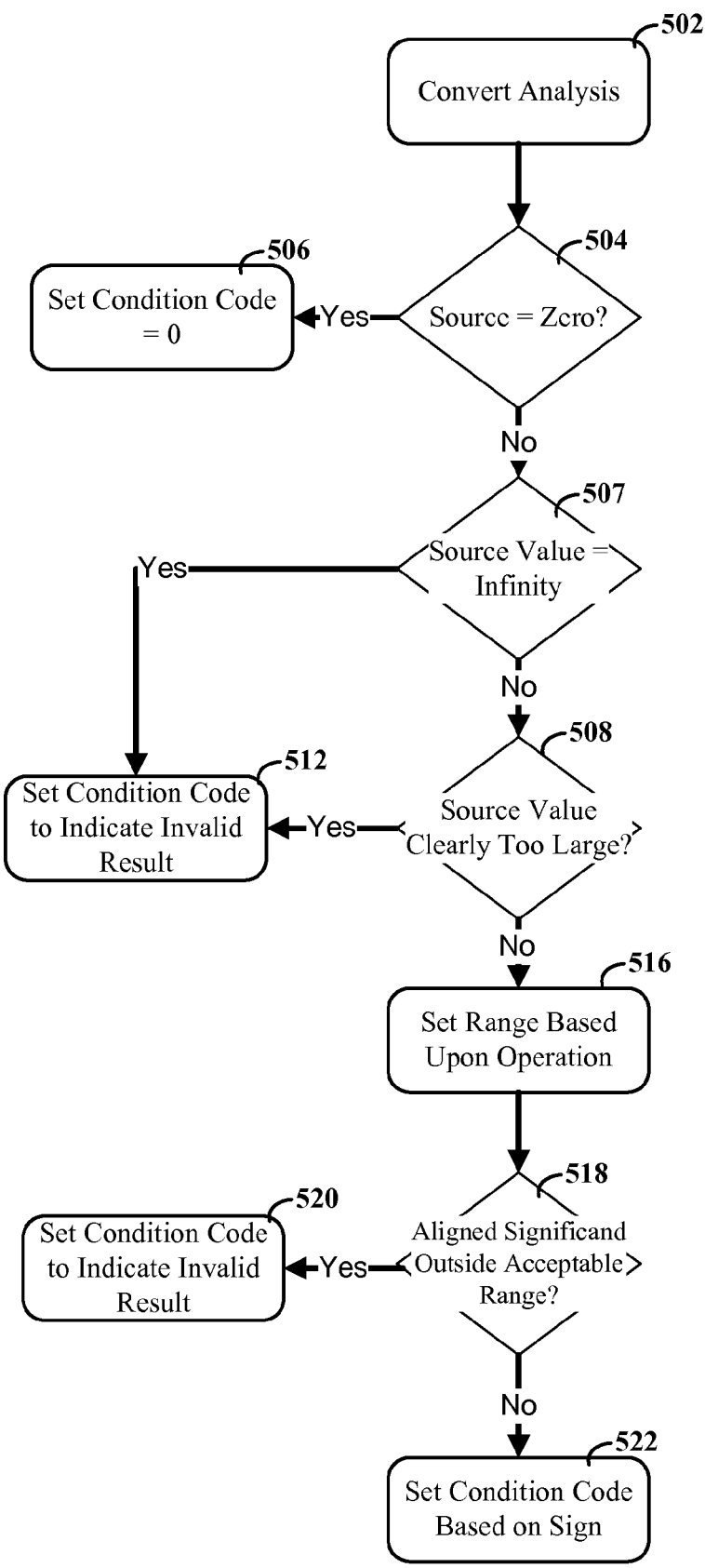
FIG. 5 depicts a flow diagram for determining a condition code for a convert floating point to integer operation, consistent with embodiments of the present disclosure.

FIG. 5 depicts a flow diagram for determining a condition code for a convert floating point to integer operation, consistent with embodiments of the present disclosure. The flow diagram of FIG. 5 begins at block 502 under the assumption that computer processor circuit has determined that the relevant operation is for a convert analysis, such as the determination process discussed in connection with FIG. 4. The condition code logic circuitry can be configured to determine whether or not the source value is equal to zero, per block 504. If the source value is equal to zero, then the result of the conversion will also be zero. The condition code can be set accordingly, per block 506. If the source value is not equal to zero, then the condition code logic circuitry can be configured to determine whether or not the source value is an Infinity, per block 507. If the source value is an Infinity, then the conversion would overflow and the condition code can be set according to an invalid result from the operation, per block 512.

If the source value is not equal to zero and not equal to Infinity, then the condition code logic circuitry can be configured to determine whether or not the source value (V) is clearly too large (in magnitude) to be represented as integer in the target precision. For example for binary floating-point converts, if the magnitude of V is more than 2 times larger than the largest integer (Nmax) in the target precision, then the conversion of V would necessarily overflow. For example for decimal floating-point converts, if the magnitude of V is more than 10 times greater than Nmax, the conversion will necessarily overflow. For either case, this can be detected based on the exponent and the number of leading zeros in the mantissa of the source operand. This way too large case of the source value can be detected. In particular instances, this can include determining whether the exponent indicates that the conversion will result in an overflow or valid number, regardless of the significand value.

If the condition code logic circuitry determines that the source value is clearly too large, then the condition code can be set accordingly (e.g., indicating an invalid result from the operation), as shown in block 512. Consistent with embodiments, the determinations indicated by block 512 can be made relatively early in the pipeline stages of the computer processor (e.g., before shifting operations are performed on the significand). Consistent with embodiments, the determinations indicated by block 508 can be made relatively early in the pipeline stages of the computer processor (e.g., before shifting operations are performed on the significand).

If the exponent indicates that the conversion is not clearly too large, then the condition code logic circuitry can be configured to set an appropriate range for the signficand, per block 516. This range can be set based upon values that would result in an overflow based upon the particular settings of the conversion operation. A few examples of such values and their relation to various settings are provided herein.

Based upon the determined range, the condition code logic circuitry can then determine whether the aligned significand is outside of the acceptable range, per block 518. If so, then the conversion will result in an overflow and the condition code can be set accordingly, as shown by block 520. If not, then the condition code can be set assuming valid conversion result, per block 522. For instance, the condition code can specify whether the resulting value will be greater than zero or less than zero based upon the sign of the source. Consistent with embodiments, the condition codes in blocks 520 and 522 rely upon the aligned significand, and therefore, are carried out after shifting of the significand.

According to embodiments, the determination of whether or not the exponent is outside of an acceptable range can be made based upon the set of valid integer values and the type of rounding that is selected. For instance, the set of valid integer values can depend upon the number of available bits (e.g., 32 bits vs. 64 bits) and whether the integer is signed or unsigned. The following table shows the last valid numbers for integers relative to different decimal floating point conversions:

TABLE 1

| Type | Upper Value | Lower Value |
| --- | --- | --- |
| Unsigned 32 Bit | 4,294,967,295 | 0 |
| Signed 32 Bit | 2,147,483,647 | −2,147,483,648 |
| Unsigned 64 Bit | 18,446,744,073,709,551,615 | 0 |
| Signed 64 Bit | 9,223,372,036,854,775,807 | −9,223,372,036,854,775,808 |

The above numbers can be extended to other limits, such as 16 bit integers or 128 bit integers and the like. Consistent with embodiments, the condition code logic can include a comparison of the shifted significand against these numbers. The use of a dedicated comparison logic for the specific number(s) can allow for the condition code to be determined before normalization and rounding is completed. Moreover, the condition code logic can be configured to account for one or more different rounding settings. Examples of rounding settings include: truncate, round nearest up on 0.5, round nearest down on 0.5 and round up for all. During a shift operation that aligns the significand, the processor can store data as it is shifted out of the useable, integer portion of the significand. For example, the process can store and use guard and sticky bits.

The guard bit can represent the value of the bit most recently shifted out of the useable portion of the representable portion of the number. In the case of a decimal floating-point convert to integer, this is first position after the decimal place. The sticky bit can be used to identify whether any of the bits shifted out of the useable portion are a "1". According to embodiments, the following table represents how the guard and stick bits can be used in connection with the number range from TABLE 1 (where the number(s) of the range are "N"). For instance, for an unsigned 32 bit integer that uses "round up" the last acceptable number is 4,294,967,259 with the guard bit 0 and the stick bit 0. Thus, if number is 4,294,967,259, and either the guard bit or stick bit are 1, then the number would result in an overflow.

TABLE 2

| Round Type | Guard | Sticky |
| --- | --- | --- |
| Truncate | 9 | 1 |
| Nearest (down) | 5 | 0 |
| Nearest (up) | 4 | 1 |
| Always Round Up | 0 | 0 |

Figure 6:
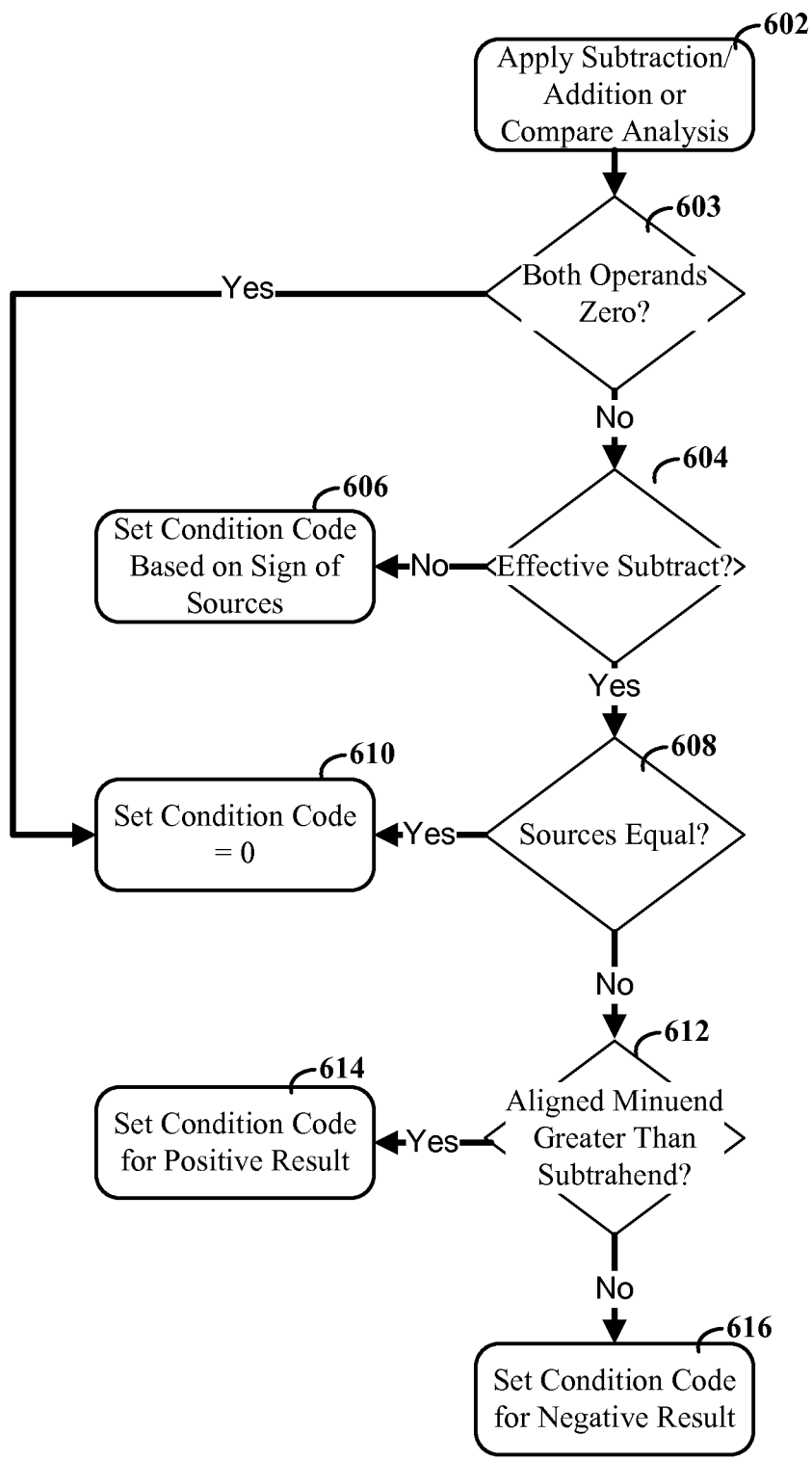
FIG. 6 depicts a flow diagram for determining a condition code for an addition or subtraction floating point operation, consistent with embodiments of the present disclosure.

FIG. 6 depicts a flow diagram for determining a condition code for an addition or subtraction floating point operation, consistent with embodiments of the present disclosure. The flow diagram begins, at block 602, under the assumption that computer processor circuit has determined that the relevant operation is an addition or subtraction, such as the determination process discussed in connection with FIG. 4. The condition code logic circuitry can be configured to detect whether or not both operands are zero, as shown by block 603. If both are zero, then the result of the operation (whether addition or subtraction) will be zero and the condition code can be set accordingly, per block 610. Otherwise, the condition code logic circuitry can be configured to determine whether or not the operation is an effective subtraction, per block 604. As used herein, an effective subtraction occurs when an addition operation is performed on operands with opposite signs, or when a subtraction operation is performed on operands with like signs. Accordingly, the determination can be accomplished by comparing the signs of the two operands in view of whether the operation specifies an addition or subtraction. For instance, if the instruction operation specifies an addition and the signs do not match (one is positive and one is negative) then the operation is an effective subtract; otherwise, the operation is an effective addition. Similarly, if the instruction operation specifies a subtraction and the signs match (both are positive or both are negative) then the operation is an effective subtract; otherwise, the operation is an effective addition. If the operation is not an effective subtraction, then the result will match the sign value of the effective addition and the condition code can be set, as indicated by block 606.

In various embodiments, the processing pipeline uses selection logic to ensure that that the larger of the two operands (e.g., operand "A") is in the same position. For example, if the operation specifies an effective addition of "A+B," then the result of effective addition will match the sign of A.

If the operation is an effective subtract, then the condition code logic circuitry can determine whether the operands are equal to each other, per block 608. If so, then the result of the subtract will be zero and the condition code can be set accordingly, as shown by block 610. If not, then the condition code logic circuitry can be configured to compare the size of the aligned minuend to the subtrahend (e.g., where the minuend of A-B is A, and the subtrahend is B). If the minuend is greater, then the result will be positive, and the condition code can be set as indicated by block 614. If the minuend is smaller, then the result will be negative, and the condition code can be set as indicated by block 616.

Figure 7:
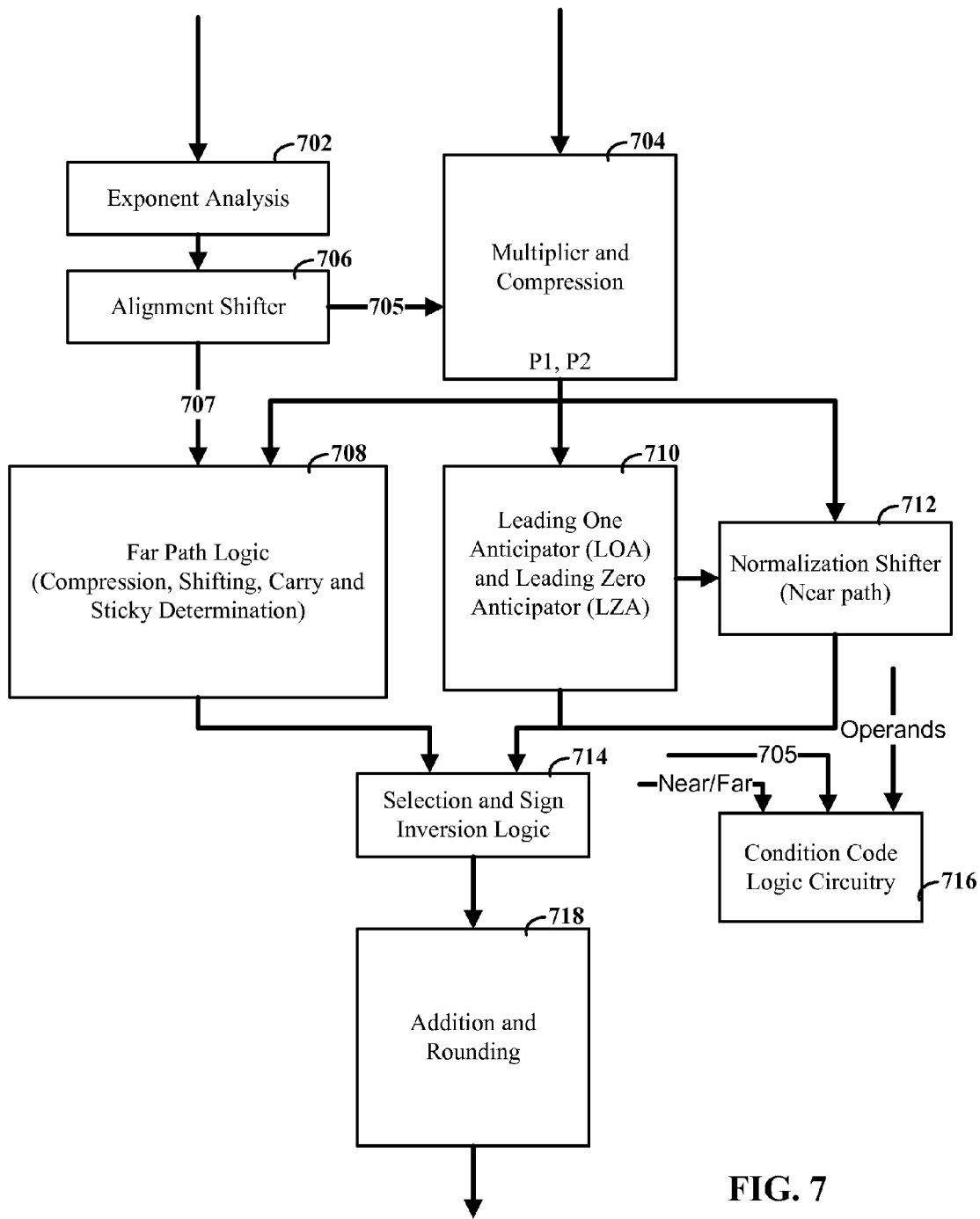
FIG. 7 depicts a block diagram of a floating point processor, consistent with embodiments of the present disclosure.

FIG. 7 depicts a block diagram of a floating point processor, consistent with embodiments of the present disclosure. Consistent with various embodiments, the condition code logic circuitry can be used with a variety of different floating point processors and their associated ISAs. For instance, the condition code logic circuitry can be configured to operate with a floating point processor that implements one or more of fused multiply add (FMA) instructions, scalar instructions, single instruction multiple data (SIMD) instructions, and a dataflow split in near and far paths. In various embodiments, an ISA may provide one or more of these functions, such as multiple user-level fused multiply-accumulate (FMA) instructions. FMA instructions can be used to perform fused multiply-add operations (including fused multiply-subtract and other varieties) on packed or scalar data elements of the instruction operands. Different FMA instructions may be designed to handle different types of arithmetic operations on the source operands.

The floating point processor of FIG. 7 is consistent with a split path FMA design. In single path floating-point adders, the critical path, in terms of latency, can include alignment shifter, adder, normalization, and rounding. Accordingly, the far and near paths can provide multiple data paths for handling operations. The near path may be used to handle operations when the difference between exponents of the operands is within a threshold range, while the far path may be used to handle cases where the difference between the exponents is outside this threshold range (e.g., 2 for the far path). If the exponent difference is outside the threshold, a full alignment shift of the addend is carried out. In this case, the addend is either much larger or much smaller than the product, so that on a subtraction at most one leading bit can cancel out and only a short normalization shift is required. For the near path, i.e., if the exponent difference is inside the threshold, just a few bit wide alignment shift is carried out. Since addend and product are roughly of the same size, a subtraction can result in massive cancellation, which then requires a wide normalization shift. Accordingly, exponent analysis block 702 and alignment and near/far determination block 706 can be configured to select the appropriate path and compute the alignment shift amount.

Alignment block 706 performs the alignment shift based on the shift amount. The alignment block 706 provides a full aligned addend (CF) via port 707 for the far path, and it provides an early-out partially shifted addend (CN) for the near path via port 705.

As part of an FMA operation A*B+C, multiplier and compression block 704 can compute the product of A and B as the sum of two partial products P1 and P2, i.e., A*B=P1+P2. For the near path, the multiplier block 704 also compresses the partially aligned addend CF (707) into the two partial products, computing P1+P2=A*B+CN.

The far path logic 708 processes the fully aligned addend CF and the partial products P1 and P2, compressing them to 2 values, performing a short normalization shift on these two values, and detecting carry and sticky bit information.

For the near case, leading one anticipator (LOA) and leading zero anticipator (LZA) 710 can be used to predict the shift amount for normalization based upon the number of leading zeroes (for a positive number) or leading ones (for a negative number).

The normalization shifter 712 can shift the partial products P1 and P2 based upon the normalization shift amount provided by block 710. Selection and sign inversion logic 714 can be configured to select between the near and far paths and to correct for situations such as 1 bit cancellation or 1 bit carry-out conditions. Addition and rounding block 718 can be configured as a compound adder which computes (sum, sum+1) of its two inputs and also provides rounding and the 1-bit post-rounding normalization.

As discussed herein, condition code logic circuitry 716 can be configured to generate condition codes using data available prior to rounding and normalization. Moreover, in some instances the condition code can be generated purely based on the operands, the partially aligned addend CN (705), and near/far path information. Moreover, if the far path is selected, and the operation is an effective subtract operation and the exponent of the subtrahend is larger then the exponent of the minuend, then the value of the result will have the opposite sign of the minuend. For any other far case the result will have the same sign as the first operand (the minuend for effective subtract operations). If for an addition, subtraction or convert, the near path is selected, the decision of boxes 518 and 612 can be applied to the A operand and the partially aligned addend CN.

The split path FMA design of FIG. 7 is provided as but one example. Condition code logic circuitry can be used in connection with a variety of other processors. For instance, the condition code logic circuitry can be used in connection with floating point units that are compliant with IEEE 745 This may include using condition code logic circuitry in connection with processors having a microarchitecture similar to the Jaguar, or Family 16h, which is a microarchitecture by Advanced Micro Devices, Inc.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system for generating a condition code that depends upon a numerical output of a floating point operation for a processing pipeline, the system comprising:
   logic circuitry configured to
     determine a classification for the floating point operation of a received instruction, wherein the determine the classification is by determining that the floating point operation of the received instruction is a convert to integer operation for an operand;

calculate, in response to the classification and using condition determination logic, a value for the condition code by inferring from data that is available from the processing pipeline before the numerical output is available, wherein the calculate the condition code is by determining that the operand is a valid, non-zero, number and by detecting that the convert to integer operation will not result in an overflow condition by detecting that an exponent and alignment of the operand are outside of a range of values; and provide the value for the condition code to branch decision logic of the processing pipeline.

2. The system of claim 1, wherein the logic circuitry is configured to detect that the convert to integer operation will not result in an overflow condition by detecting that an exponent and alignment of the operand are within a first range of values, and in response, by detecting that a mantissa of the operand is within of a second range of values and by checking bits shifted out of a useable, integer portion of the mantissa.

\* \* \* \* \*